Sept. 15, 1970          R. L. LEE ET AL          3,528,176
DISPOSABLE PLASTIC MOUNTING MEMBER FOR
THREE-DIMENSIONALLY-ADJUSTABLE
FACE BOW SUPPORT
Filed June 13, 1968
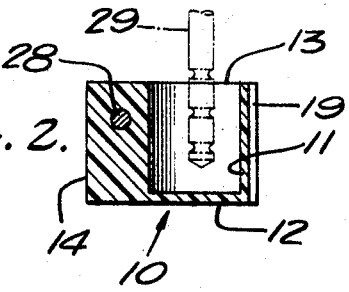
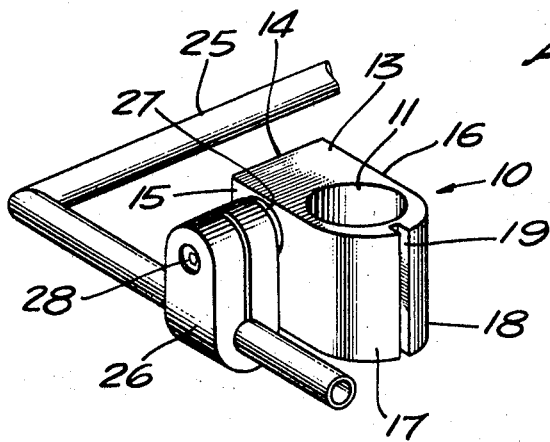
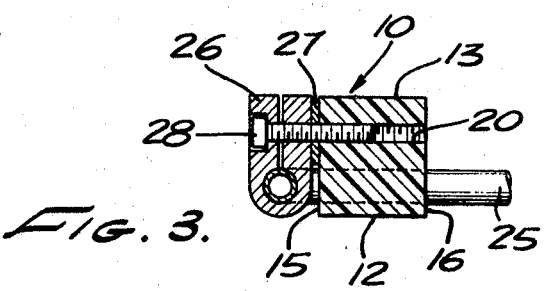
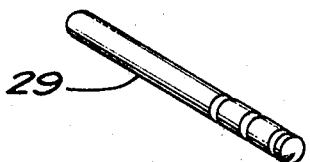
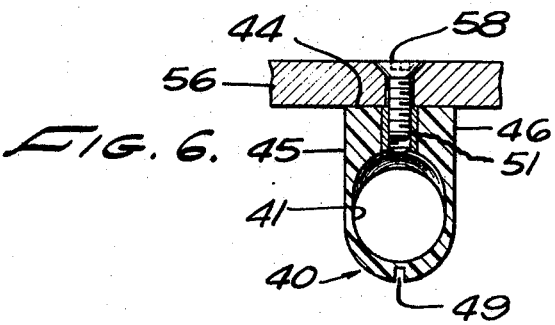
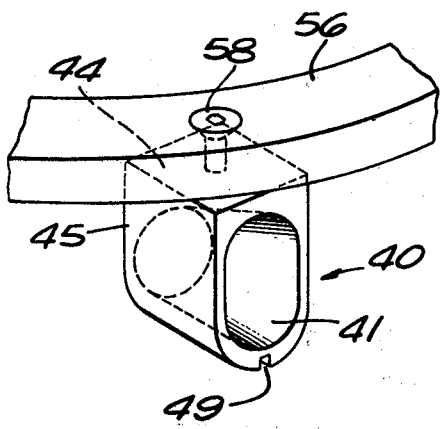
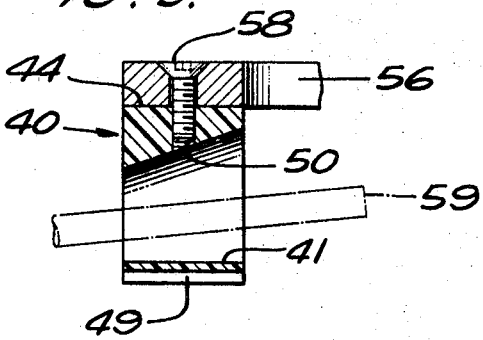
INVENTORS
ROBERT L. LEE
JACOB L. SCHARTZ
BY
*Buehler & Aranto*
ATTORNEYS

United States Patent Office 3,528,176
Patented Sept. 15, 1970

3,528,176
DISPOSABLE PLASTIC MOUNTING MEMBER FOR THREE-DIMENSIONALLY-ADJUSTABLE FACE BOW SUPPORT
Robert L. Lee, Colton, and Jacob L. Schwartz, Covina, Calif., assignors to DentoNamics Corporation, Inglewood, Calif., a corporation of California
Filed June 13, 1968, Ser. No. 736,829
Int. Cl. A61c 9/00
U.S. Cl. 32—19                     6 Claims

ABSTRACT OF THE DISCLOSURE

A disposable mounting member which is integrally formed of rigid but frangible plastic material, which has a cavity for receiving the end of a supporting rod in spaced relationship thereto so that quick-setting plaster may be poured in the cavity to fix the relative positions of the member and the rod, and also having a hole aligned perpendicular to the longitudinal axis of the cavity for receiving another support member in an adjustable position relative thereto.

BACKGROUND OF THE INVENTION

In dental apparatus it is often necessary to precisely position a face bow relative to a corresponding jaw of the patient, and to support the face bow in its selected position of adjustment. For this purpose it is desirable and perhaps necessary to utilize support means which is adjustable with reference to six different parameters, i.e., position or spacing along the X, Y, and Z axes, and also angular adjustment relative to each of the axes.

SUMMARY OF THE INVENTION

According to the present invention an integrally formed rigid plastic block is provided with a hole and a cavity, the hole being adapted to receive one support member and the cavity to receive another. A threaded bolt or the like is inserted into the hole, and the plastic member may be rotated relative to that supporting bolt before the support is tightened or fastened. The cavity in the plastic member is made relatively large so as to receive an otherwise free end of a support rod in spaced relationship to the walls of the cavity. The position of the rod end may be adjusted in all six parameters relative to the plastic member, and then the cavity is filled with quick-setting plaster so as to fix the relative positions. The plastic member has a thin wall bounding one edge of the cavity, and a groove is formed in that thin wall to facilitate the deliberate breakage of the wall after the product has served its purpose. After the particular dental procedure has been completed a screwdriver or like instrument is inserted into the groove of the thin wall and twisted; the thin wall is thereby broken; and the quick-setting plaster may then be removed from the position adjustment rod without any significant inconvenience or loss of time.

PREFERRED EMBODIMENTS

FIGS. 1 to 3, inclusive, illustrate a preferred embodiment of the invention for supporting an upper face bow, while FIGS. 4 to 6, inclusive illustrate a preferred embodiment of the invention for supporting a lower face bow.

FIG. 1 is a perspective view of a mounting cup for an upper face bow showing how it is supported from a U-rod attached to an upper clutch;

FIG. 2 is a vertical cross-sectional elevational view of the mounting cup of FIG. 1 showing the insertion of the lower end of a position adjustment rod therein;

FIG. 3 is a cross-sectional view of the device taken through the left hand side of FIG. 2;

FIG. 4 is a perspective view of a mounting well for a lower face bow showing its attachment to the lower face bow;

FIG. 5 is a vertical cross-sectional view taken through the mounting well of FIG. 4;

FIG. 6 is a vertical cross-sectional view taken transversely through the mounting well as shown in FIG. 5; and FIG. 7 is a perspective view of the position adjustment rod of FIG. 2.

In FIGS. 1 to 3 the mounting member or mounting cup is designated as 10, while a U-rod that is supported from the upper face bow is designated as 25. A U-strap 26 carried near the end of U-rod 25 receives a threaded bolt 28 which extends through the mounting member or cup 10 (see FIG. 3). A small washer 27 is inserted between U-strap 26 and the mounting cup 10. Mounting cup 10 has a cavity 11 which is open at its upper end so as to receive, in spaced relationship to its own walls, the lower end of a position adjustment rod 29. The lower end of rod 29 is knurled so as to retain the quick-setting plaster which is poured into cavity 11 after the relative positions of cup 10 and rod 29 have been determined.

More specifically, mounting member 10 has a roughly cubical configuration with a thickness in two directions of about one inch and in the third direction of about one and one-half inches. The member 10 has a first pair of side surfaces 12, 13 which are perpendicular to one of its short axes, and which are also flat and parallel to each other. The member 10 also has one end surface 14 which is flat and which is disposed perpendicular to the long axis of the member. A second pair of side surfaces 15, 16 are perpendicular to the other short axis of the member, and are also flat surfaces and lie parallel to each other adjacent to the end surface 14. However, the side surfaces 15 and 16 are curved towards each other at 17, 18, respectively, so as to form an essentially semi-cylindrical end surface at the other end of the long axis of the member.

The cavity 11 is of a generally cylindrical configuration, and is formed in the side surface 13 with its longitudinal axis disposed perpendicular to the side surface 13. Cavity 11 has a diameter of about a half inch and is located immediately adjacent the semi-cylindrical end surface 17, 18, so as to leave a thin wall therebetween. A groove 19 is formed in the exterior surface of the thin wall and extends essentially parallel to the longitudinal axis of cavity 11.

In the member 10 a hole 20 is formed which extends from the side surface 15 to the side surface 16, being located approximately half way between the flat end surface 14 and the nearest wall of cavity 11. Hole 20 has interior threads formed in the plastic material so as to threadedly receive the bolt 28. A corresponding opening formed in the U-strap 26 is not threaded, hence the tightening of bolt 28 serves to force U-strap 26 and member 10 toward each other, thereby fixing the relative positions of member 10 and bolt 28. Prior to such tightening, however, member 10 may be freely rotated relative to the axis of hole 20 and hence the longitudinal axis of bolt 28. It is of some significance that by means of the hole 20 the member 10 is adjustable relative to bolt 28; by means of the cavity 11 it is adjustable relative to the end of rod 29; but the longitudinal axes of hole 20 and cavity 11 are mutually perpendicular.

In the embodiment of FIGS. 1 to 3, inclusive, all of the structural members except the mounting member 10 are preferably made of metal, and hence are permanent parts of the apparatus. The cavity 11 of member 10 is adapted to be filled with quick-setting plaster (not shown)

for fixing the relative positions of rod 29 and member 10. After the particular dental procedure has been completed, it will then be desired to separate the member 10 and the rod 29 from each other. For that purpose the groove 19 is provided. A screwdriver or other similar instrument is inserted into the groove 19 and twisted, thus breaking the thin wall which separates groove 19 from cavity 11. It then becomes possible to break and remove the plaster occupying the cavity 11, and thereby conveniently separate rod 29 from the member 10. Bolt 28 is removed, and the broken remains of member 10 and the plaster with which it had been filled are thrown away.

In FIGS. 4 to 6, inclusive, a mounting member 40 is constructed and utilized in essentially the same manner as the mounting member 10 previously illustrated. In FIGS. 4 to 6, inclusive, the corresponding parts are identified by the same reference numeral but raised by 30. There are, however, certain differences from the first embodiment of the invention.

Thus in FIGS. 4 to 6 the cavity 41 is horizontally disposed, rather than being disposed vertically as is cavity 11. The end face 44 abuts immediately against the under-surface of the lower face bow 56, and a threaded bolt 58 passes vertically downward through an opening in the lower face bow 56 and into the hole 50 of the mounting member 40. The hole 50, rather than extending between side surfaces 45 and 46 in a manner which would correspond to the first embodiment, extends between the end surface 44 and the adjacent interior wall of cavity 41. A support rod 59 extends in a generally horizontal direction through the cavity 41, the support rod 59 being an end of a U-rod that is in turn attached to the patient's lower clutch.

As best seen in FIG. 5 it is preferred to form the cavity 41 with a larger diameter at one end than at the other. The small diameter end of cavity 41 is on the side toward the patient's mouth and the lower clutch, with the large diameter end facing outward. This facilitates the angular adjustment of the rod end 59 relative to the member 40.

Cavity 41 is filled with quick-setting plaster in the same manner as cavity 11, and the groove 49 is used for breaking the thin wall at the edge of the cavity in the same manner as groove 19 of member 10 is used.

An optional feature of the invention shown only in FIG. 6 is a threaded metallic insert 51 received in hole 50.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. For use in dental apparatus, a disposable plastic mounting member integrally formed from rigid plastic material, having a roughly cubical configuration with a thickness in two directions of about one inch and in the third direction of about one and one-half inches, the side surfaces perpendicular to one of the short axes being flat and parallel to each other, one end surface being flat and perpendicular to the long axis, the side surfaces perpendicular to the other short axis being also flat and parallel to each other adjacent said one end surface but being curved towards each other to form an essentially semi-cylindrical end surface at the other end of the long axis, a generally cylindrical cavity formed in one of said first-named side surfaces with its longitudinal axis perpendicular to said side surface and having a diameter of about a half inch and being located adjacent said semi-cylindrical end surface so as to leave a thin wall therebetween, a groove formed in the exterior surface of said thin wall and extending essentially parallel to the longitudinal axis of said cavity, and a hole formed in said mounting member in a direction perpendicular to the longitudinal axis of said cavity for attaching said mounting member to a supporting device in a position relative thereto which is adjustably rotatable about the longitudinal axis of said hole; said cavity being adapted to receive a rod end in a selected three-dimensional position relative to said member and to then be filled with quick-setting plaster for maintaining said selected position; said thin wall being frangible and said groove being adapted for breaking said thin wall after the member has been used so as to facilitate the removal of said plaster therefrom.

2. The device claimed in claim 1 wherein said hole is threaded.

3. The device claimed in claim 1 which further includes a threaded metallic insert received in said hole.

4. The device claimed in claim 1 wherein one end of said cavity is closed, and said hole extends parallel to said one end surface between said last-named side surfaces.

5. The device claimed in claim 1 wherein said cavity is open at both its ends, and said hole extends from said one end surface in a direction perpendicular thereto into said cavity.

6. The device claimed in claim 5 wherein said cavity is of larger diameter at one end than at the other; said thin wall in the vicinity of said groove being, however, of the same thickness throughout the length of said cavity.

References Cited

UNITED STATES PATENTS

| 2,814,876 | 12/1957 | Stuart | 32—19 |
| 3,074,166 | 1/1963 | Skallerup | 32—19 |

ROBERT PESHOCK, Primary Examiner